July 22, 1924.

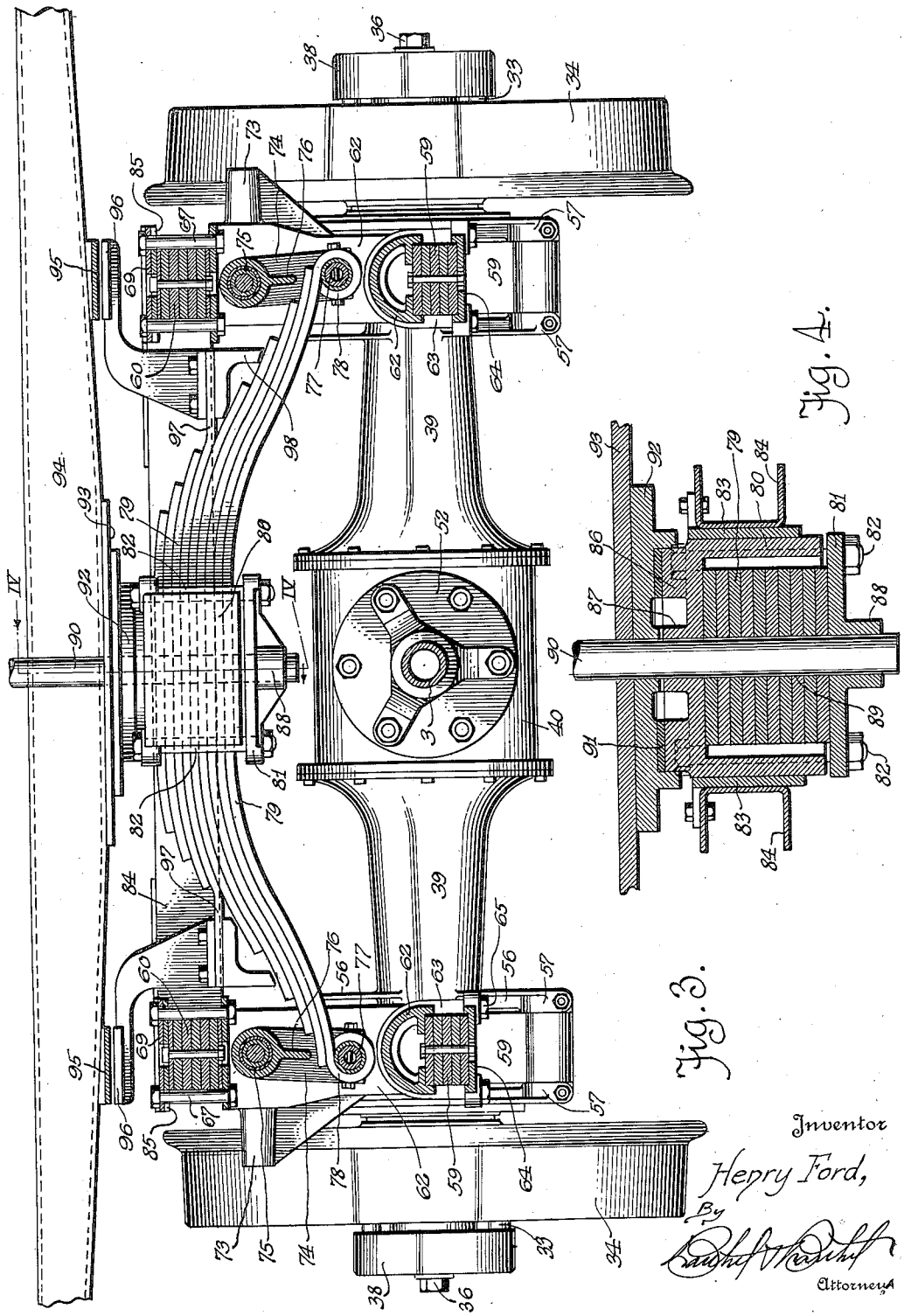

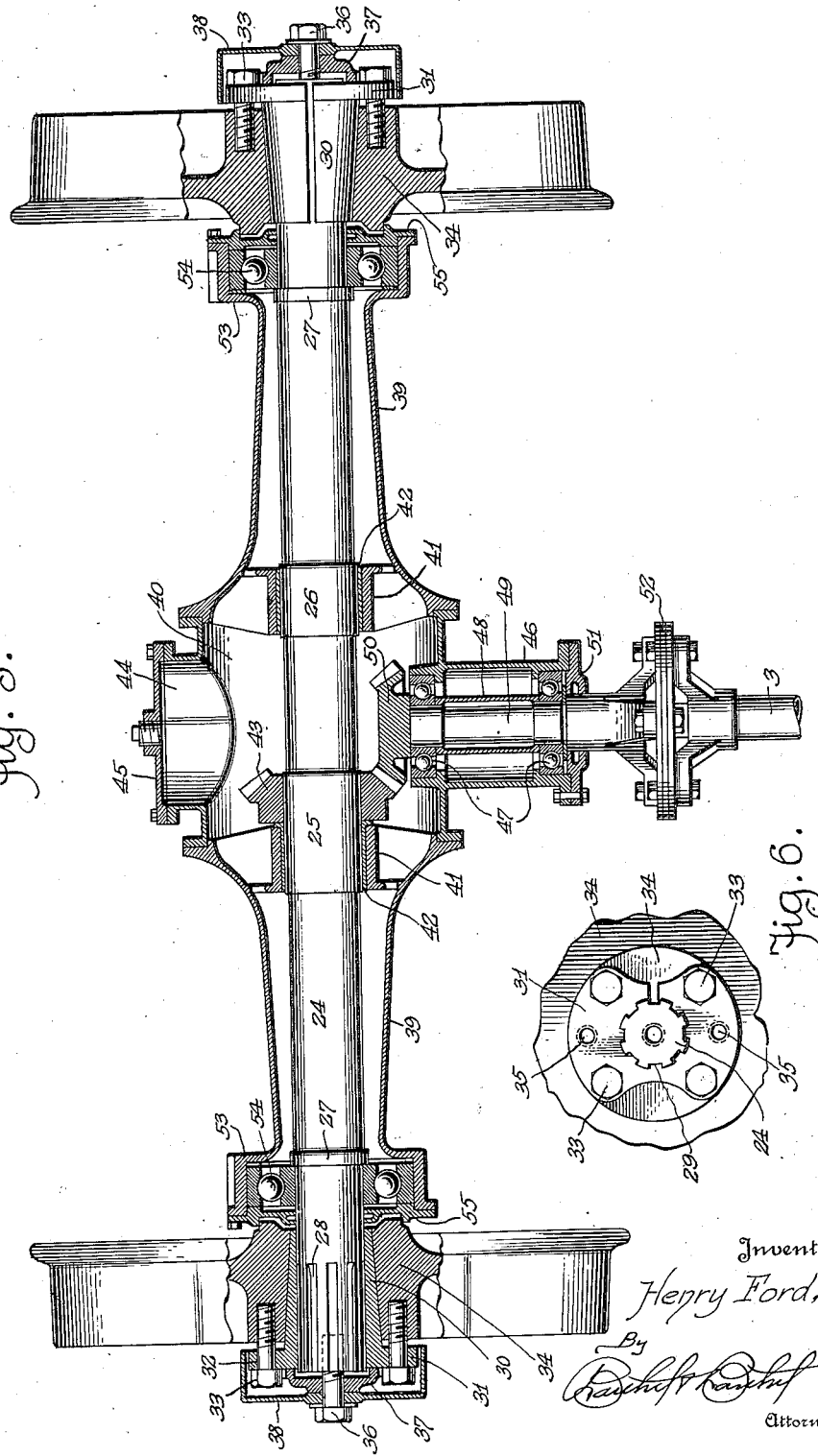

H. FORD

RAILWAY CAR TRUCK

Filed Jan. 8, 1922

Inventor
Henry Ford.
By
Attorneys

Patented July 22, 1924.

1,502,241

UNITED STATES PATENT OFFICE.

HENRY FORD, OF DEARBORN, MICHIGAN.

RAILWAY-CAR TRUCK.

Application filed July 8, 1922. Serial No. 573,624.

*To all whom it may concern:*

Be it known that I, HENRY FORD, a citizen of the United States of America, residing at Dearborn, in the county of Wayne and State of Michigan, have invented certain new and useful Improvements in Railway-Car Trucks, of which the following is a specification, reference being had therein to the accompanying drawings.

In my pending application filed May 13, 1921, Serial No. 469,146, there is disclosed an automotive railway car including trucks, a power plant and a transmission mechanism. The power plant is made the subject matter of an application filed Jan. 3, 1922, Serial No. 526,539; the transmission the subject matter of a companion application filed under even date, and this application is directed to the trucks which have been especially designed for my automotive railway car, but which are capable of general use in connection with rolling stock.

Trucks in accordance with my invention may be characterized in the following particulars:

First, each truck includes a novel spring support for a bolster and a car frame adapted to be yieldably supported from the bolster, the arrangement of springs being such as to provide primary and secondary cushioning means for a car body or frame relative to axles of the truck.

Second, there is an arrangement of axles, one of which is inert and the other adapted to be driven by power transmission means extending across the inert axle in a plane with the driven axle and operatively connected thereto, such arrangement of the operating means being permissible by virtue of the configuration of the inert axle.

Third, the arrangement whereby one axle of each truck is a driven axle.

Fourth, the usual rigid side frames of a railway truck are eliminated and leaf or laminated springs substituted therefor in a manner that will insure a safe and durable construction and at the same time afford a degree of resiliency or flexibility which is desirable in trucks to eliminate rail pounding and vibrations, and at the same time reduce wear particularly when a truck travels on a curved section of track.

Fifth, the construction entering into my truck, permits of the parts being expeditiously assembled, readily inspected and easily lubricated.

The above are a few of the features of this invention, and reference will now be had to the drawings, wherein—

Fig. 3 is a cross sectional view of the truck taken on the line III—III of Fig. 1;

Fig. 4 is an enlarged longitudinal sectional view of a portion of the truck taken on line IV—IV of Fig. 3;

Fig. 5 is a horizontal sectional view of the driven axle assembly;

Fig. 6 is a side elevation of a wheel hub construction forming part of the drive axle assembly.

*The inert axle.*

Figure 1:
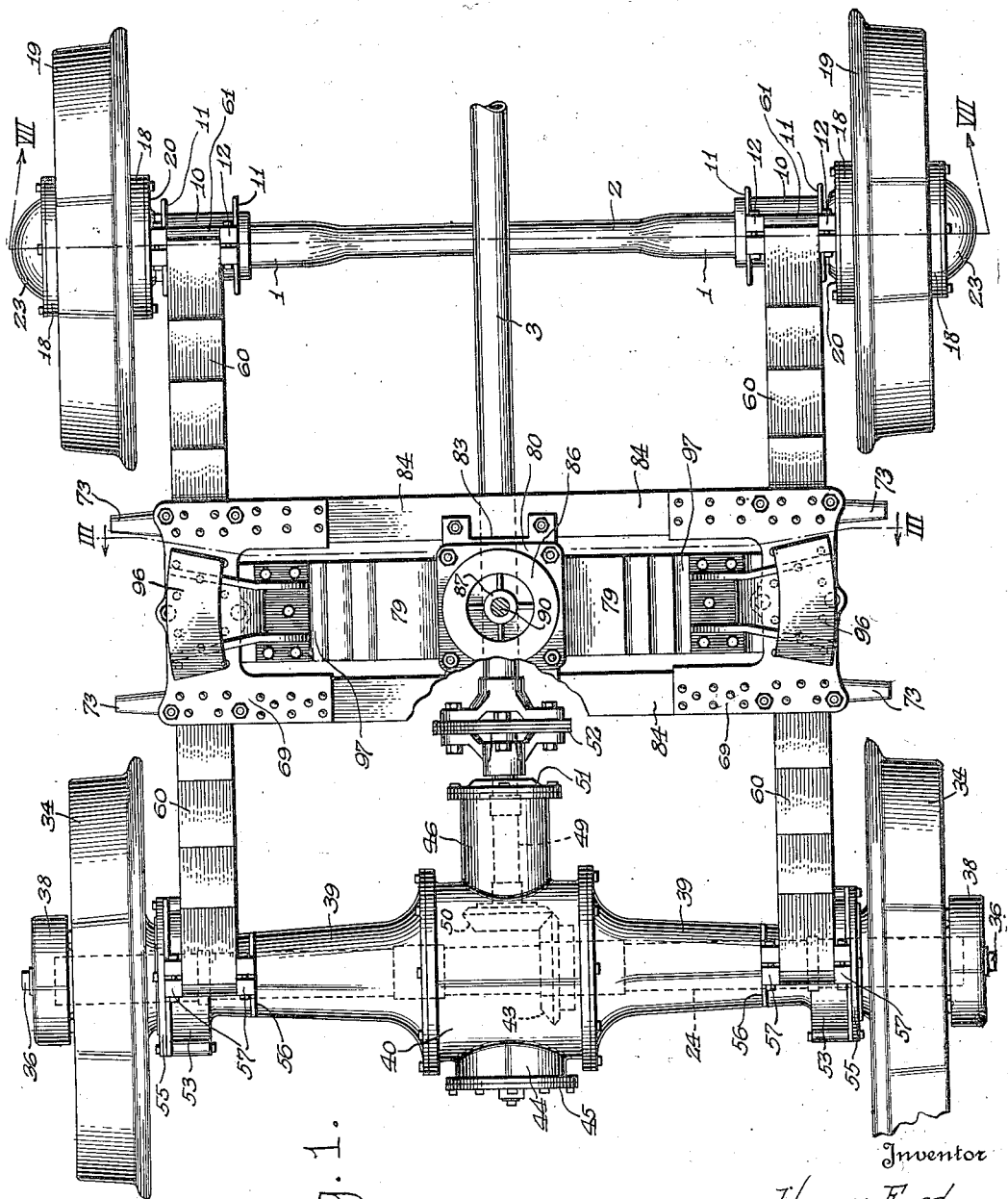
Figure 1 is a plan of one of the trucks, partly broken away.
Figure 7:
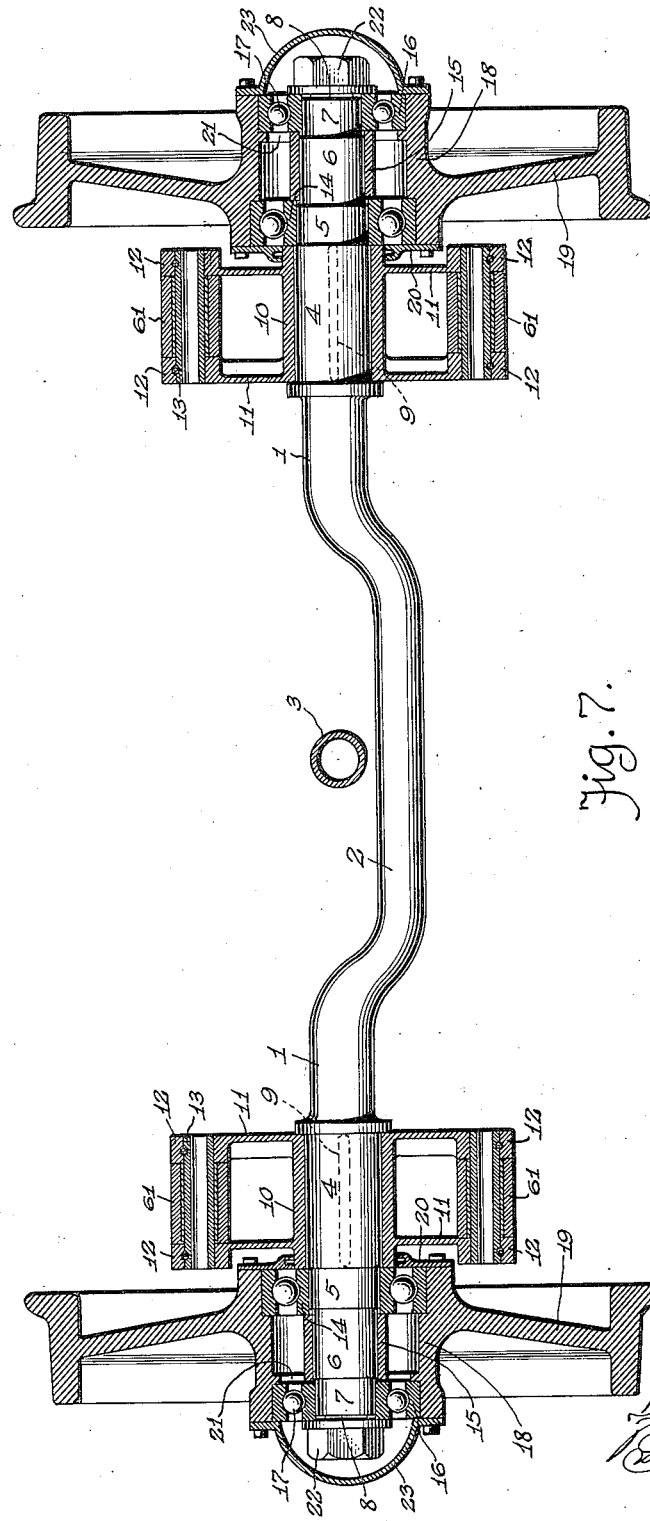
Fig. 7 is a longitudinal sectional view of the inert axle assembly taken on the line VII—VII of Fig. 1.

Referring to Fig. 1 the inert axle may be considered as being at the inner end of the truck for the reason that the power transmission mechanism extends longitudinally of the truck and across the inert axle. The axle assembly is best shown in Fig. 7 and the axle proper is designated 1 and has a central dropped or depressed portion 2 providing clearance for a longitudinally disposed drive shaft 3 extending across the depressed portion 2 of the axle, at a right angle thereto and intersecting the axis of the greater part of the inert axle.

In forging or forming the axle 1, its ends are provided with stepped portions 4, 5, 6, 7 and 8. Keyed or otherwise fixed, as at 9, on each stepped portion 4 is the hub 10 of a set of parallel vertically disposed brackets 11 extending above and below the stepped portion 4 of the axle and the ends of the brackets 11 are formed with split clamping members 12 in which may be clamped tubular shackle or spring bolts or pins 13. The brackets 11 are rigid relative to the axle 1 and are used, in a manner as hereinafter set forth, for constantly maintaining the axle 1 in a defined position.

On the stepped portions 5 and 7 of the axle are mounted inner race members 14 of anti-frictional bearings, said inner race members being spaced apart by spacing sleeves 15 on the stepped portions 6 of the axle 1. Surrounding the inner race members 14 are outer race members 16 and between said inner and outer race members are anti-frictional balls or rollers 17.

On the outer race members 16 are the hubs 18 of flanged wheels 19, and the anti-frictional bearing surrounding the stepped portion 5 of the axle is mounted in the inner face or end of the hub 18 and retained therein by a conventional form of dust guard 20 secured to the hub 18 and engaging the hub 10 of the brackets fixed on the stepped portion 4 of the axle 1.

The anti-frictional bearing which surrounds the stepped portion 7 of the axle 1 is set in the outer face or end of the wheel hub 18 against an annular flange 21 and is held in place by a nut 22 or other holdfast device mounted on the stepped portion 8 of the axle. A suitable cap 23 is secured to the outer face or end of the wheel hub 18 to enclose the outer end of the axle and cooperate with the wheel hub 18 in providing a lubricant chamber in which grease or a heavy lubricant may be placed to insure free rotation of the flanged wheel 19 relative to the end of the axle. The dust guard 20 prevents excessive waste of the lubricant at the inner end of the wheel hub.

The live axle.

Figs. 1, 3 and 5 are relied upon to show the live axle assembly and the axle, per se, is designated 24 and in forging, forming or machining the axle it is provided with collars 25, 26 and 27 and with longitudinal and circumferentially disposed grooves or rib-ways 28 adapted to receive complemental ribs 29 on the inner cylindrical wall of a longitudinally split bushing 30. This bushing has an outer tapered wall and an end flange 31 said wall tapering inwardly from the flange or outer end of the bushing. The flange has a series of openings 32 to receive screw bolts 33 adapted to engage in the outer end of a flanged wheel hub 34 having a tapering bore to receive the bushing 30. The screw bolts 33 are adapted to be tightened to draw the wheel hub 34 and the bushing 30 together, and in doing this the split bushing is contracted about the axle to such an extent that it cannot be slipped therefrom, thereby establishing a driving relation between the axle and the hub. The flange 31 of the bushing has diametrically opposed openings 35 with the walls thereof screwthreaded and adapted to receive two of the screw bolts 33 when it is desired to extract or force the bushing 30 out of the wheel hub 34. When the screw bolts are screwed in the openings 35, the inner ends of the screw bolts will engage the outer end of the wheel hub 34 and by tightening or further screwing the two screw bolts the bushing will be forced outwardly and can be removed from the outer end of the axle. Then the wheel hub can be easily removed.

After the bushing 30 has been loosened or started from the end of the axle a suitable instrument may be placed behind the flange 31 and against the outer end of the wheel hub 34 to pry the bushing off of the axle.

Mounted coaxially of each end of the live axle 24 is a retaining bolt 36 for a nut locking member 37 and a cap 38, the nut locking member 37 engaging the heads of the screw bolts 33 to prevent accidental rotation thereof, and the cap 38 inclosing the member 37 and the flange 31 of the bushing 30.

Inclosing the live axle 24 are axle tubes 39 connected by a differential housing 40 and the inner ends of the axle tubes 39 have integral bearings 41 provided with bushings 42 in which are journaled the collars 25 and 26 of the axle 24, the collar 25 being of sufficient length to permit of a beveled gear wheel 43 being mounted thereon. The housing 40 has a hand hole 44 normally closed by a cover 45 and coaxially of the hand hole 44 is a detachable hollow housing extension 46 provided with anti-frictional bearings 47 and a spacing sleeve 48 for a gear shaft 49 axially of the extension 46. The rear or inner end of the shaft 49 has a beveled gear wheel 50 meshing with the beveled gear wheel 43 of the axle 24. The outer or front end of the gear shaft 49 extends through a dust guard 51 suitably connected to the housing extension 46 and terminates at a conventional form of coupling 52 by which the gear shaft 49 is connected to the longitudinally disposed drive shaft 3. Various forms of universal coupling may be used for this shaft connection.

The outer ends of the axle tubes 39 terminate in hollow cylindrical heads 53 containing anti-frictional bearings 54 against the collars 27 of the axle 24 and the anti-frictional bearings 54 are retained in the heads 53 by dust guards 55 engaging the axle 24 and the inner ends of the wheel hubs 34. Integral with the heads 53 are sets of brackets 56 extending above and below said heads, said brackets being similar to the brackets 11 of the inert axle assembly, insomuch, that the brackets 56 terminate in split clamping members 57 for shackle or spring bolts or pins 58.

Spring articulation of the axle assemblies.

Connecting the brackets 11 of the inert axle assembly to the brackets 56 of the live axle assembly are plural leaf upwardly extending superposed resilient springs 59 and 60, said springs being bowed or arch shaped with the ends thereof terminating in eyes 61 provided with bushings to receive the pins or bolts 13 and 58. The springs are therefore disposed in sets with the laminated springs 60 superposed relative to the springs 59, and mounted between the springs 59 and 60 of each set is a substantially rectangular frame 62 fixed on the short leaf of the spring 59 by U-bolts 63, a bottom plate 64 and nuts 65. The top of the frame 62 affords a perch 66 for the long leaf of the spring 60 and said spring is held on the perch by straight bolts 67, U-bolts 68, a top plate 69 and nuts 70. The U-bolts 68 engage under bosses 71 of the frame 62 and connecting said bosses is a nut equipped suspension bolt 72.

Extending outwardly from the sides of the bosses 71 and the frame 62 are brackets 73 for brake shoe hangers (not shown).

Bolster spring.

Figure 2:
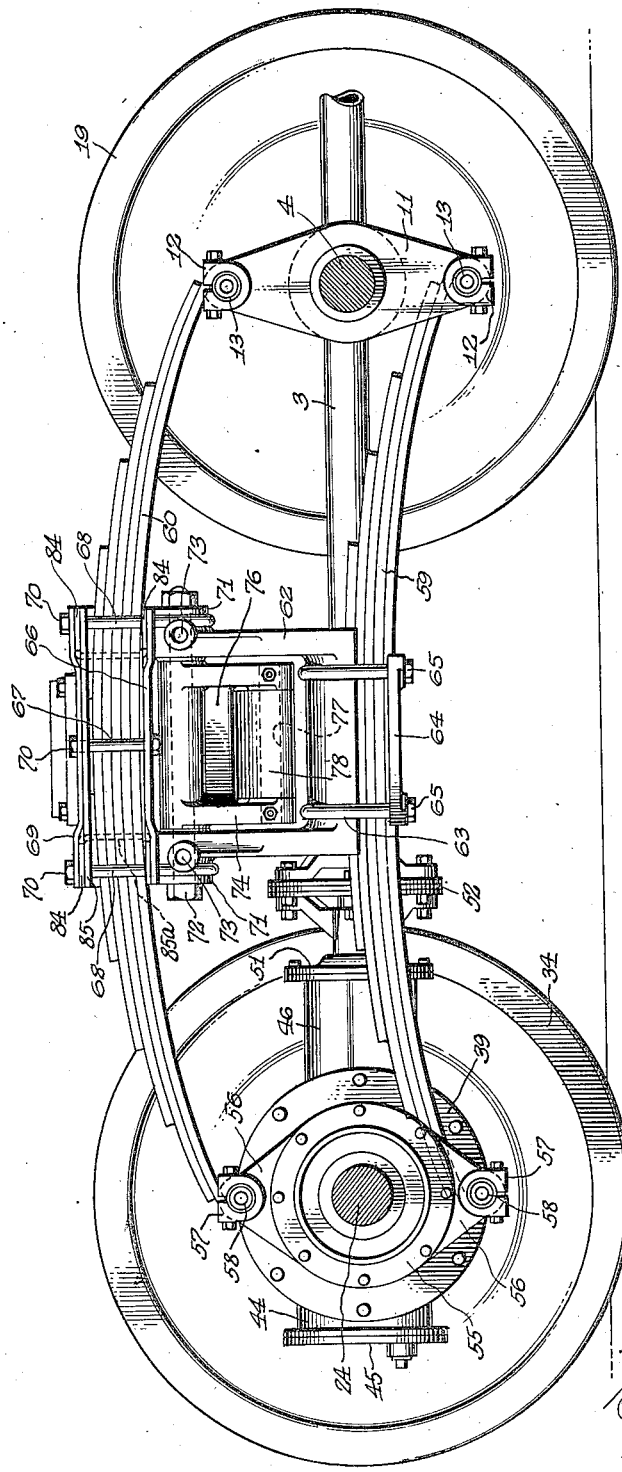
Fig. 2 is a longitudinal sectional view of the truck, partly in elevation.

Suspended or pivotally mounted on the bolts 72 of the frames 62 are suspension frames or hangers 74 having the barrels 75 thereof provided with bushings or linings to receive the bolts 72 and said barrels are reinforced by ribs 76. Mounted in the lower ends of the frames are bolts or pins 77 supporting the end eyes 78 of a transversely disposed laminated upwardly bowed or arch shape bolster spring 79. The central portion of the spring 79 as best shown in Fig. 4, is inclosed by a housing 80 and a detachable bottom plate 81, said housing and bottom plate being connected by a plurality of vertically disposed nut equipped bolts 82. Opposed walls of the housing 80 are slidable in or against wear plates 83 mounted against the inner walls of parallel channel members 84 forming part of a transversely disposed bolster. The backs or vertical flanges of the channel members 84 confront each other and the backs or vertical flanges at the ends of the bolster, are cut away, as at 85ᵃ, to permit of the ends of the bolster being held relative to the side springs 60. By reference to Fig. 2 it will be noted that the ends of the lower lateral flanges of the channel members 84 are sandwiched between the long leaves of the springs 60 and the perches 66 of the frames 62, while the ends of the upper lateral flanges of the channel members 84 extend under the top plates 69 and on to intermediate plates 85 on the spring 60. The top plates 69 extend along the upper lateral flanges of the channel members 84 and are riveted or otherwise connected thereto, as best shown in Fig. 1.

The fabricated bolster constitutes a transverse tie member between the side springs 60 and with the frames 62 connecting the superposed side springs it is apparent that the side springs will prevent excessive lateral swaying of the bolster. Vertical adjustment of the bolster, however, is not interfered with and the bolster springs 79 will cooperate with the side springs 59 and 60 in cushioning said bolster.

The top of the housing 80 is formed to provide an annular bed 86 and a concentric guide or bearing 87 alining with a similar guide or bearing 88 of the bottom plate 81, and the spring 79 has a vertical opening 89 providing clearance for a king pin or bolt 90 extending through the guides or bearings 87 and 88. Slidable on the annular bed 86 is a shim or wear member 91 mounted in a turn table 92 through which the king pin or bolt 90 extends, and on the turn table 92 is a sill 93 for a transversely disposed car frame or girder 94 adapted to form part of a car body or platform (not shown). To prevent excessive side tilting of the frame or girder 94 the lower face of said frame or girder has shoes 95, best shown in Fig. 3, adapted to engage pads or brackets 96 mounted on the ends of an intermediate leaf 97 of the bolster spring 79, the said spring leaf being of sufficient length to permit of its ends being placed in a horizontal plane not only to support the pads or brackets 96, but angular stop members 98 held in place by the same fastening means as the pads or brackets 96 and adapted to engage the bolster 79 when excessive pressure is brought to bear on the pads or brackets 96.

When using my railway car equipped with trucks as herein described, I found that the side springs 59 and 60 compensated for the ordinary jars and vibrations set up while traveling and of course flexure of these side strains cause the inert axle assembly to move relative to the live axle assembly, but under normal or smooth traveling conditions a constant relation is maintained, between the axle assemblies of the truck. It is only a heavy load or excessive vibration that brings the bolster spring 79 into action and it will be noted that the fabrication of this spring is much heavier than that of the side springs. If the bolster spring 79 is flexed the lower ends of the suspension frames 74 swing outwardly while the bolster maintains a spaced relation between the superposed side frames without any danger of the upper springs 60 spreading outwardly relative to the lower springs 59. In other words, the relation of springs is such that a desired degree of flexibility is retained without sacrificing strength. The spring suspension resists any torque reaction of the live axle and transmits the driving efforts of the wheels to the car, thus providing to a great extent a cushion drive.

I desire it to be understood that the construction entering into each truck is susceptible to such variations and modifications as fall within the scope of the appended claims.

What I claim is:—

1. A railway car truck comprising axle assemblies, means disposed in parallelism and connecting said axle assemblies so that one of said axle assemblies may move to and from the other axle assembly, and means transmitting power to one of said axle assemblies, one of said axle assemblies including an axle having a depressed portion providing clearance for said power transmitting means.

2. A railway car truck comprising axle assemblies, arched laminated springs disposed in parallelism and connecting said axle assemblies so that one axle assembly may move to and from the other axle assembly, a bolster connecting said springs, and means transmitting power to one of said axle assemblies.

3. A railway car truck comprising axle assemblies, parallel sets of connected superposed arched springs connecting said axle assemblies with the ends of said springs held above and below said axle assemblies and one axle assembly capable of moving to and from the other axle assembly, and means transmitting power to one of said axle assemblies.

4. A railway car truck comprising an inert axle assembly, a live axle assembly, and longitudinally disposed bolster cushioning means connecting said axle assemblies with said means permitting one axle assembly to move to and from the other axle assembly.

5. A railway car truck as called for in claim 4, and means extending across the inert axle assembly adapted to transmit power to the live axle assembly.

6. A railway car truck as called for in claim 4, wherein said means includes sets of superposed laminated springs, one spring of each set being in a plane above the axle assemblies and the other spring of each set being in a plane below the axle assemblies.

7. A railway car truck comprising axle assemblies, longitudinally disposed springs connecting said axle assemblies, a car frame, and a single laminated arched spring supporting said car frame and connecting said springs, said single spring possessing greater rigidity than said longitudinally disposed springs.

8. A railway car truck comprising axle assemblies, sets of superposed springs connecting said axle assemblies, frames connecting the springs of each set, a car frame, and car frame supporting means having its ends suspended in said frames.

9. A railway car truck as called for in claim 8, wherein one spring of each set is in a plane above said axle assemblies and the other spring of each set in a plane below the axle assemblies.

10. A railway car truck as called for in claim 8, wherein said car frame supporting means is in the form of an arched laminated spring adapted to be flexed after flexure of said superposed springs.

11. A railway car truck as called for in claim 8, and a bolster connecting said sets of superposed springs with said car frame supporting means operable through said bolster.

12. A railway car truck comprising axle assemblies, side springs connecting said axle assemblies, a bolster connecting said side assemblies, a car frame, a spring having its ends supported from said side springs, and a housing on said spring slidable in said bolster and supporting said car frame.

13. A railway car truck as called for in claim 12, and frames connected to said side springs, with said spring having its ends suspended in said frames.

14. A railway car truck as called for in claim 12, wherein said side springs are arranged in sets with the bolster connected to one spring of each set.

15. The combination of a truck, a car frame, a laminated leaf spring carried by said truck and supporting said car frame, and pads carried by the ends of one of the leaves of said spring.

16. The combination set forth in claim 15, and frames suspended relative to said truck and supporting the ends of said leaf spring.

17. Means for supporting a car frame, comprising axle assemblies, one of said axle assemblies having a stationary axle with brackets fixed thereon, the other axle assembly having a driven axle with brackets held other than on said axle, and sets of superposed arched springs connecting the brackets of said axle assemblies.

In testimony whereof I affix my signature in presence of two witnesses.

HENRY FORD.

Witnesses:
E. G. LIEBOLD,
J. E. HALL.